(12) United States Patent
Ohmori et al.

(10) Patent No.: US 7,907,207 B2
(45) Date of Patent: Mar. 15, 2011

(54) IMAGE PICK-UP DEVICE WITH A POP-UP AND RETRACTABLE FLASH

(75) Inventors: Norikatsu Ohmori, Saitama (JP); Goushi Koike, Saitama (JP); Tatsuya Yamazaki, Tokyo (JP); Noriaki Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 11/924,446

(22) Filed: Oct. 25, 2007

(65) Prior Publication Data

US 2008/0151072 A1   Jun. 26, 2008

(30) Foreign Application Priority Data

Dec. 25, 2006   (JP) ................................ P2006-346917

(51) Int. Cl.
*H04N 5/222* (2006.01)
*H04N 5/225* (2006.01)
(52) U.S. Cl. ........................ 348/373; 348/371
(58) Field of Classification Search .................. 348/370, 348/371, 373, 374, 375, 376; 396/176, 177, 396/178
See application file for complete search history.

(56) References Cited

U.S. PATENT DOCUMENTS

| | | | | |
|---|---|---|---|---|
| 5,822,638 | A * | 10/1998 | Yoshida et al. | 396/448 |
| 6,247,855 | B1 * | 6/2001 | Motohashi et al. | 396/448 |
| 6,584,285 | B2 * | 6/2003 | Nagata | 396/177 |
| 6,925,254 | B2 * | 8/2005 | Kato et al. | 396/177 |
| 7,423,690 | B2 * | 9/2008 | Lee et al. | 348/374 |
| 7,671,895 | B2 * | 3/2010 | Kobayashi | 348/220.1 |
| 7,701,505 | B2 * | 4/2010 | Kikuchi | 348/374 |
| 2002/0031344 | A1 * | 3/2002 | Nagata | 396/177 |
| 2004/0212709 | A1 * | 10/2004 | Lee et al. | 348/333.01 |
| 2005/0200718 | A1 * | 9/2005 | Lee | 348/220.1 |
| 2005/0200748 | A1 * | 9/2005 | Lee et al. | 348/373 |
| 2005/0200754 | A1 * | 9/2005 | Lee | 348/376 |
| 2007/0177863 | A1 * | 8/2007 | Ishikawa et al. | 396/177 |

FOREIGN PATENT DOCUMENTS

| | | |
|---|---|---|
| JP | 3-18518 | 2/1991 |
| JP | 10-285455 | * 10/1998 |
| JP | 11-142924 | 5/1999 |
| JP | 2001-111877 | 4/2001 |
| JP | 2005-260951 | 9/2005 |
| JP | 2005-275038 | 10/2005 |
| JP | 2006-133297 | 5/2006 |
| JP | 2006-154175 | 6/2006 |
| JP | P2006-295272 | 10/2006 |

* cited by examiner

*Primary Examiner* — Nicholas G Giles
(74) *Attorney, Agent, or Firm* — K&L Gates LLP

(57) ABSTRACT

An image pick-up device includes a camera body; a lens barrel mounted to the camera body; a pop-up type flash device that is retracted in the camera body when not in use and projected from the camera body when in use; and a structure including a gripping surface provided by one side surface of the camera body and an open portion provided in a given surface that extends between a front end of the gripping surface and a front part of the lens barrel. The flash device is retracted in the camera body through the open portion when not in use and projected sideward to the outside of the camera body through the open portion when in use.

6 Claims, 9 Drawing Sheets

IMAGE PICK-UP DEVICE WITH A POP-UP AND RETRACTABLE FLASH

CROSS REFERENCES TO RELATED APPLICATIONS

The present application claims priority to Japanese Patent Application JP 2006-346917 filed in the Japanese Patent Office on Dec. 25, 2006, the entire contents of which are incorporated herein by reference.

BACKGROUND

The present application relates to image pick-up devices having a pop-up type flash device that is retractable in a body of the image pick-up device when not in use and projectable from the body when in use.

Usually, the pop-up type flash devices are mounted on an upper surface (or upper wall) of the body of image pick-up device. (In the following, the body of image pick-up device will be referred to "camera body" for ease of description.) See for example Japanese Laid-open Patent Application (Tokkai) 2006-295272. However, in camera integrated video recorders or the like, the upper surface of the camera body is commonly used as a mount means for mounting thereon an accessory shoe and a microphone. In particular, the upper surface of the camera body is an ideal mounting area for a 4-channel microphone.

Although, the upper surface of the camera body is a useful place for mounting thereon the pop-up type flash device, accessory shoe and microphone as mentioned hereinabove, the upper surface of the camera body sometimes fails to provide a sufficient space for mounting thereon both the flash device and microphone.

Furthermore, when the camera body is constructed to have at one side thereof a storage portion for a recording medium such as a tape cassette or the like, the side portion of the camera body is projected radially outward due to provision of the recording medium storage portion, and thus, a gap inevitably formed between it and a lens barrel is marked making the aesthetic external appearance of the image pick-up device poor.

SUMMARY

It is desirable to solve the above-mentioned drawbacks of conventional image pick-up devices by mounting the flash device to a side surface of the camera body, so that the accessory shoe and microphone can be mounted on the upper surface of the camera body. For example, it is desirable to effectively use the gap, which is inevitably formed between the projected recording medium storage portion for receiving a tape cassette or the like and the lens barrel, as a mounting space for the flash device.

In an embodiment, one side surface of a camera body equipped with a lens barrel is shaped to have a gripping surface, and a pop-up type flash device is arranged between a front end portion of the gripping surface and a front surface of the camera body.

With such measures, upper and lower surfaces of the camera body can be effectively used for mounting thereon the accessory shoe and microphone. Furthermore, due to the pop-up function of the flash device, a needed certain distance can be provided between the flash device and an image pick-up lens. Furthermore, due to arrangement on side surface of the camera body, mounting to both side surfaces of the same is facilitated.

In accordance with an embodiment, there is provided an image pick-up device which comprises a camera body; a lens barrel mounted to the camera body; a pop-up type flash device that is retracted in the camera body when not in use and projected from the camera body when in use; and a structure including a gripping surface provided by one side surface of the camera body and an open portion provided in a given surface that extends between a front end of the gripping surface and a front part of the lens barrel, wherein the flash device is retracted in the camera body through the open portion when not in use and projected sideward to the outside of the camera body through the open portion when in use.

Additional features and advantages are described herein, and will be apparent from, the following Detailed Description and the figures.

DETAILED DESCRIPTION

In the following, an embodiment will be described in detail with reference to the accompanying drawings.

Figure 1:
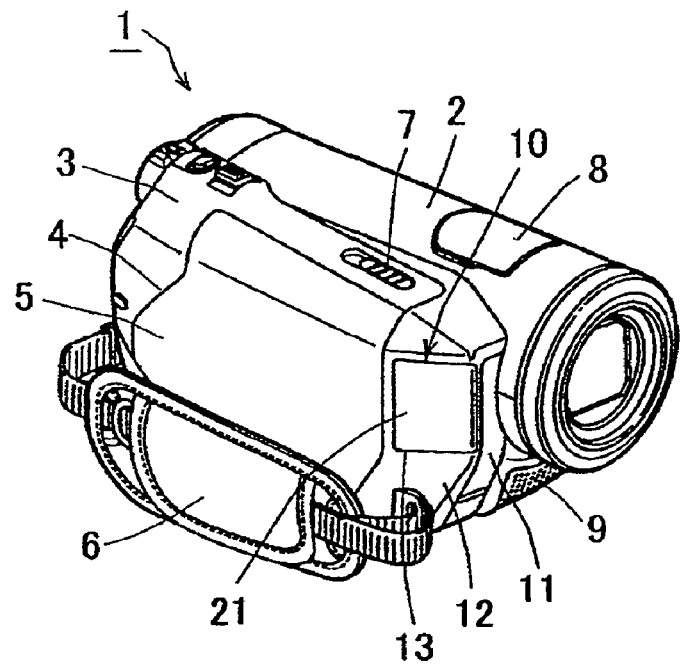
FIG. 1 is a perspective view of an image pick-up device having a flash device kept retracted.

In FIG. 1, there is shown a perspective view of an image pick-up device 1. The image pick-up device 1 is constructed as a camera-integrated video recorder. The image pick-up device 1 comprises a lens barrel 2 and a camera body 3. On one side portion of the camera body 3, there is provided a recording medium storage portion 4 for receiving a tape cassette or the like. An external surface of the recording medium storage portion 4 is shaped to serve as a gripping surface 5, and the gripping surface 5 is provided with a grip belt 6. On an upper surface of the camera body 3, there is mounted an open/eject knob 7, and to the lens barrel, there is mounted an accessory shoe 8, and to a lower surface side, there is installed a stereo microphone 9. Between a front end portion of the gripping surface 5 and the lens barrel 2, there is installed a pop-up type flash device 10.

The flash device 10 is arranged in an open portion 13 formed in an inclined surface 12 that is positioned and extends between a front end surface 11 of the camera body 3 and the front end portion of the gripping surface 5.

Figure 2:
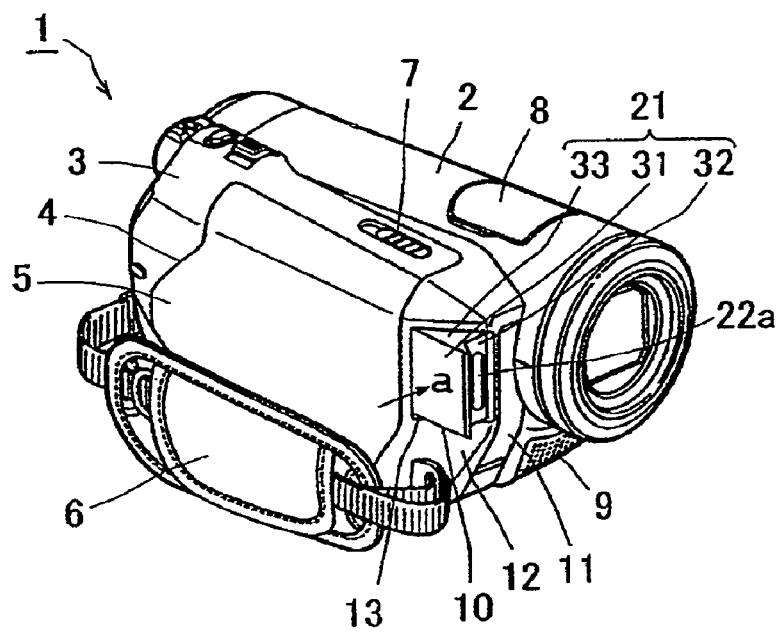
FIG. 2 is a perspective view of the image pick-up device having the flash device kept projected.

As is shown in FIG. 1, when not in use, the flash device 10 is retracted in the camera body 3, and as is shown in FIG. 2, when in use, the flash device 10 is projected from the open portion 13 toward a side of the camera body 3.

Figure 3:
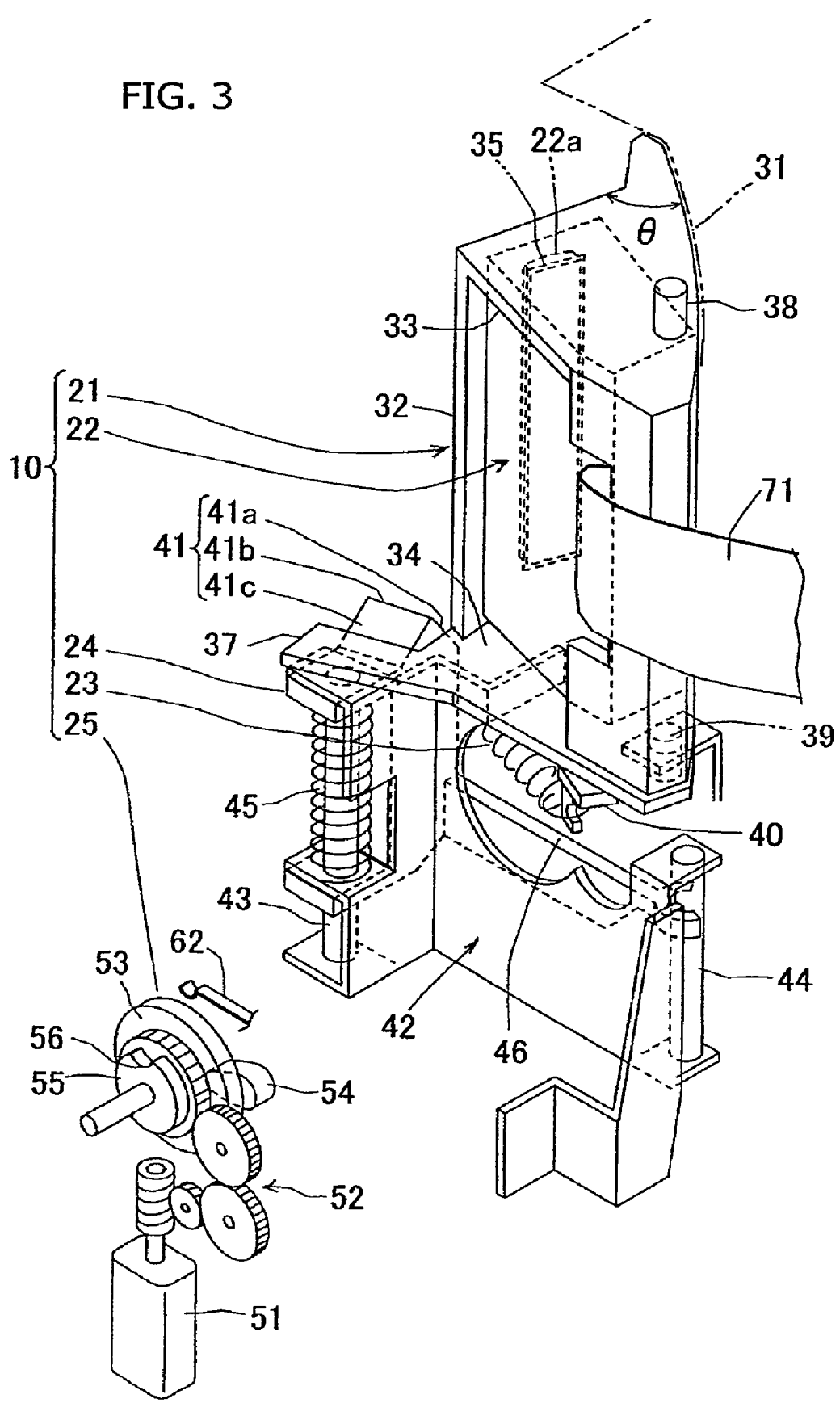
FIG. 3 is a perspective view of the flash device that is taken from a back side.

FIG. 3 is a perspective view of the flash device 10 that is taken from a back side. The flash device 10 comprises a flash device cabinet (which will be referred to as "cabinet" hereinafter) 21, a light emitter 22 that is installed in the cabinet 21, a tension coil spring 23 that provides the cabinet 21 with a biasing force in a direction to project the cabinet from the open portion 13, a lock mechanism 24 that functions to lock the cabinet 21 at a position to close the open portion 13 against the biasing force of the tension coil spring 23 and a lock canceling mechanism 25 that cancels the locked condition of the cabinet 21 by operating the lock mechanism 24.

The cabinet 21 comprises a first plate portion 31 that opens and closes the open portion 13, a second plate portion 32 that extends from one end of the first plate portion 31 with a predetermined inclination angle "θ" relative to the first plate portion 31, and third and fourth plate portions 33 and 34 that are provided to upper and lower ends of the first and second plate portions 31 and 32.

The second plate portion 32 is provided with a cut window portion 35 to which a light emitting face 22a of the light emitter 22 is fitted. Furthermore, the fourth plate portion 34 is provided at one end portion thereof with a locked portion 37 that is locked by the lock mechanism 24. The first and second plate portions 31 and 32 are provided with shaft parts 38 and 39 through which the portions 31 and 32 are rotatably installed to the camera body 3.

The light emitter 22 uses xenon tube or LED (light emitting diode) as a light source and has a lens-like light emitting face 22a from which an illumination beam is emitted. The light emitter 22 has the light emitting face 22a plugged into the cut window portion 35, and is fixed to an inner surface of the second plate portion 32 along a light emitter mounting plate 35.

The tension coil spring 23 has one end hooked to the camera body 3 and the other end hooked to a spring catch portion 40 provided to the cabinet 21, so that, as is seen from FIG. 2, the cabinet 21 is biased in a direction to be projectable from the open portion 13.

The lock mechanism 24 comprises a lift body 42 that has at an upper part thereof a reversed V-shaped lock portion 41 that is engageable with the locked portion 37 of the cabinet 21, a pair of guide shafts 43 and 44 that guide an upward and downward movement of the lift body 42, and a compressed coil spring 45 that biases the lift body 42 upward to a position to cause the reversed V-shaped lock portion 41 to engage with the locked portion 37. The lift body 42 is provided with a pressed surface 46 that is to be pressed by a first cam 54 of the lock canceling mechanism 25, which will be described in the following.

Figure 4:
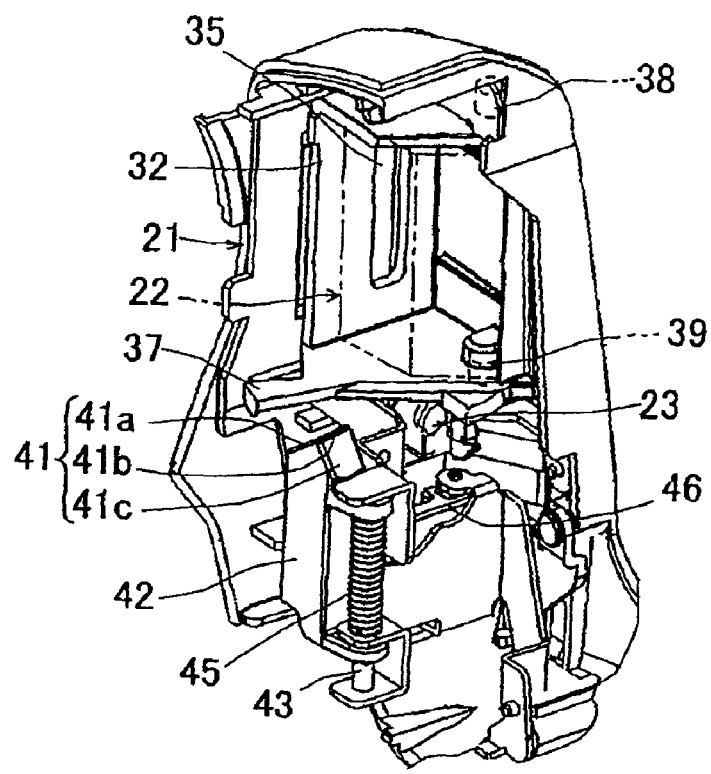
FIG. 4 is a perspective view showing a condition wherein a cabinet is not locked by a lock mechanism.

Under a condition wherein the flash device 10 is kept projected as shown in FIG. 2, the reversed V-shaped lock portion 41 and the locked portion 37 are not engaged with each other as shown in FIG. 4. When, under this condition, the cabinet 21 is turned in a direction (indicated by arrow "a") to be put into the camera body 3 by, for example, pushing an outer surface of the first plate portion 31, the locked portion 37 is brought into contact with one inclined surface 41a of the lock portion 41 thereby to push down the lock portion 41 and thus the lift body 42 against the biasing force of the compressed coil spring 45.

Figure 5:
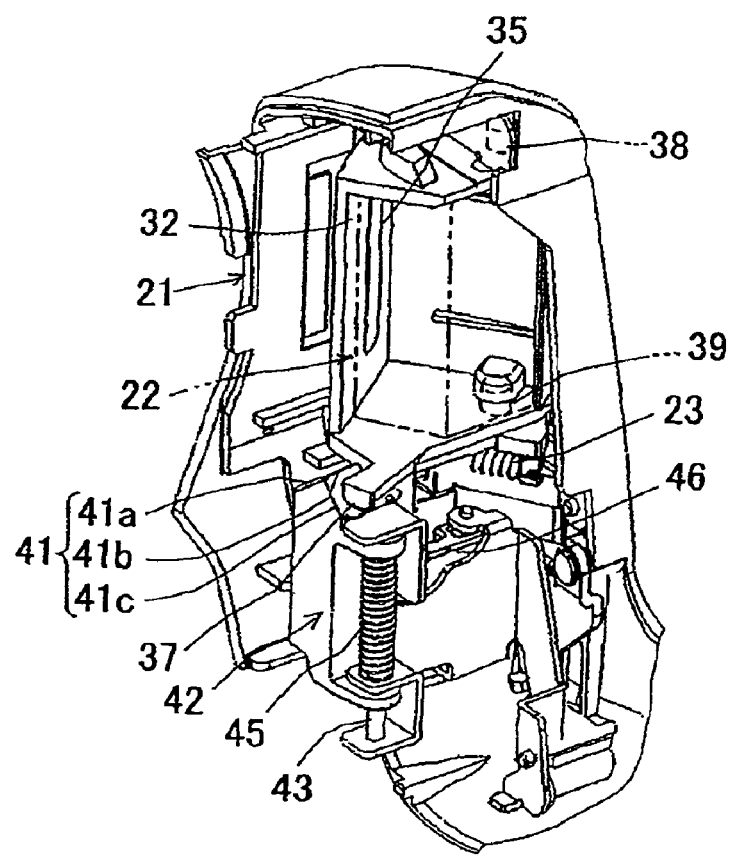
FIG. 5 is a perspective view showing a condition wherein the cabinet is locked by the lock mechanism.

When the locked portion 37 passes by a top portion 41b of the reversed V-shaped lock portion 41, the lift body 42 is automatically moved upward due to the biasing force of the compressed coil spring 45, and thus as is seen from FIG. 5, the locked portion 37 is brought into engagement with the other inclined surface 41c of the lock portion 41 thereby to stop a return turning of the cabinet 21, and thus as is seen from FIG. 1, the flash device 10 is locked in its retracted condition.

In the following, the lock canceling mechanism 25 will be described. As is seen from FIG. 3, the lock canceling mechanism 25 comprises a motor 51 and a cam plate 53 that is rotatably driven by the motor 51 through a gear train 52. One surface of the cam plate 53 is formed with a first cam 54 that functions to push down the lift body 42, and the other surface of the cam plate is formed with a second cam 55 that functions to turn off a power button of the motor 51.

Figure 6:
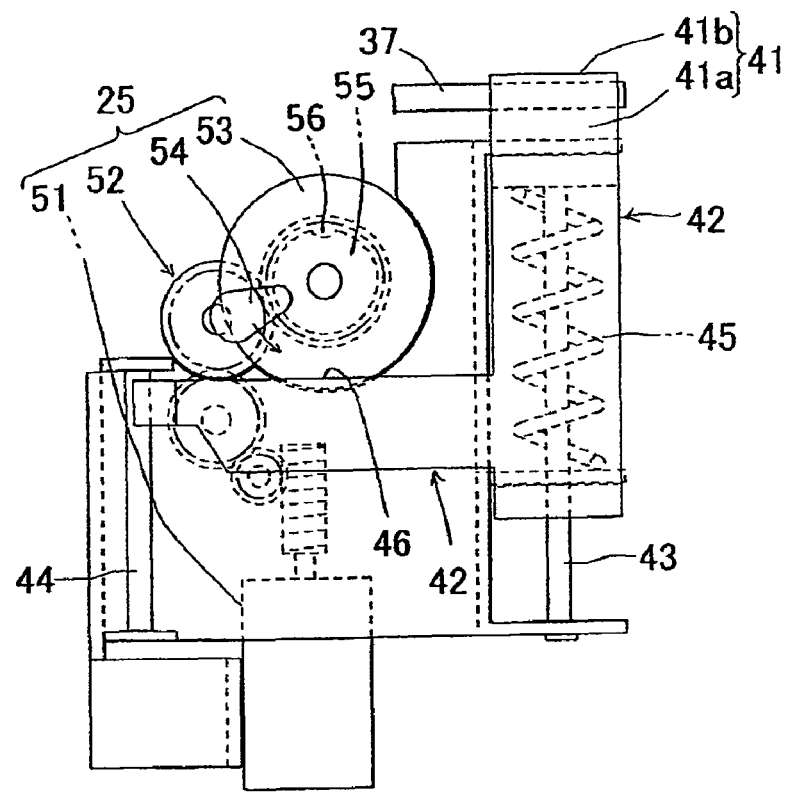
FIG. 6 is an illustration showing an operation of a first cam (before the first cam pushes down a lift body).
Figure 7:
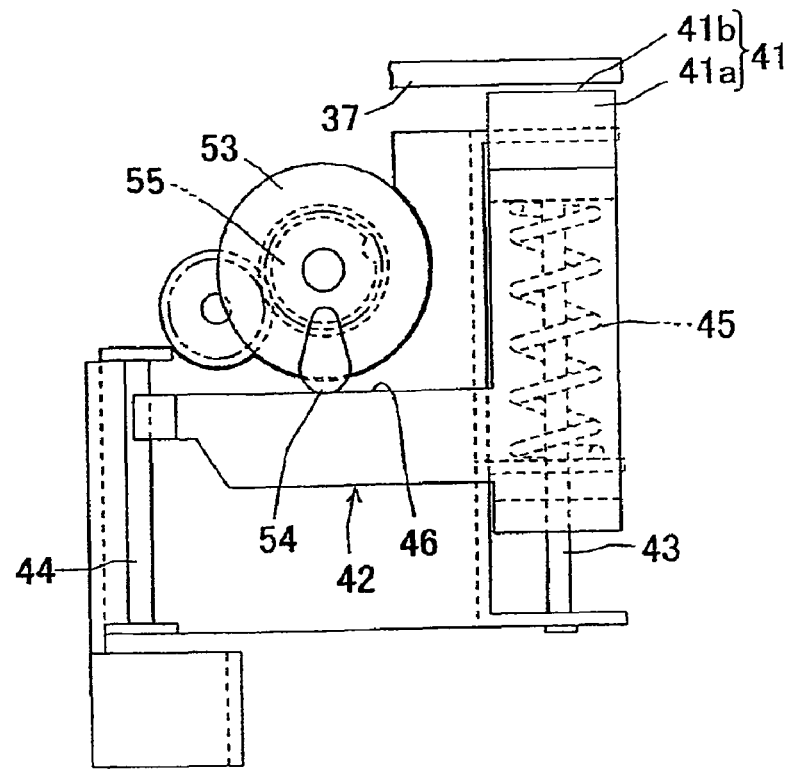
FIG. 7 is an illustration showing an operation of the first cam (after the first cam pushes down the lift body).

Under a condition wherein the flash device 10 is received in the camera body 3, the first cam 54 is not in contact with the pressed surface 46 provided by the lift body 42 as is seen from FIG. 6. When now a power button of the image pick-up device 1 is turned ON, the motor 51 is energized and thus the cam plate 52 is turned in a counterclockwise direction through the gear train 52. When the cam plate 53 is turned by a predetermined angle, the lift body 42 whose pressed surface 46 is pressed by the first cam 54 is moved downward against the biasing force of the compressed coil spring 45 as is seen from FIG. 7, and thus, the locked condition of the locked portion 37 by the lock portion 41 is cancelled. The cabinet 21, which has been released from the locked condition by the lock mechanism 24, is turned by the biasing force of the tension coil spring 23, and thus, as is seen in FIG. 2, the cabinet is projected outward from the open portion 13.

Even after the first cam 54 cancels the locked condition of the locked portion 37, the first cam 55 continuously turns the cam plate 53, and when the first cam 54 returns to its original position as shown in FIG. 6 after making one turn, rotation of the cam plate 53 is stopped.

Figure 8:
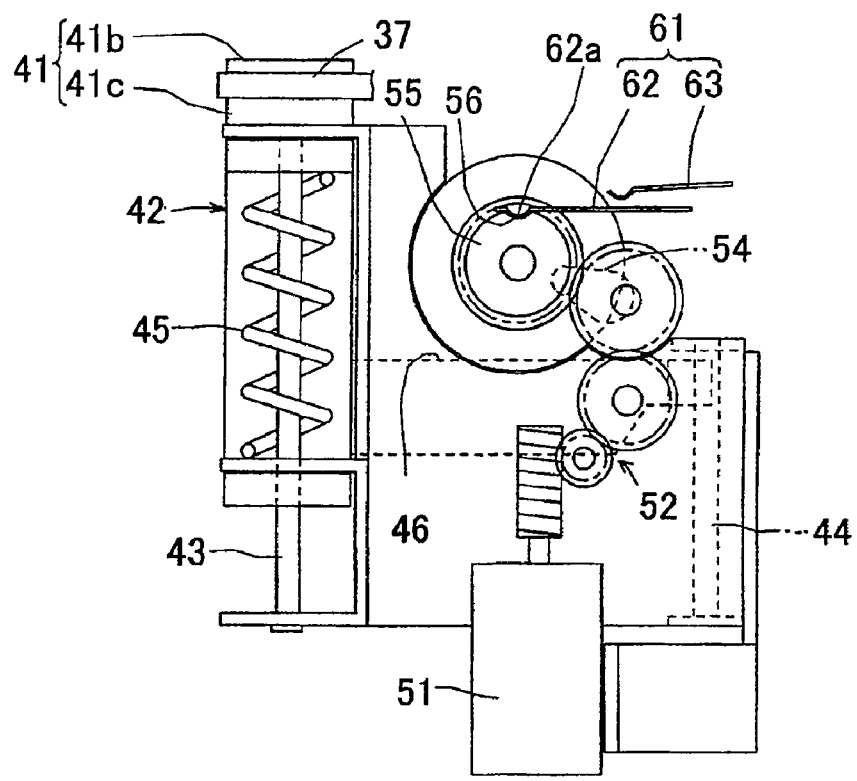
FIG. 8 is an illustration showing an operation of a second cam (before the second cam pushes down the lift body).

As is seen from FIG. 8, the second cam is constructed to have a generally circular shape, and has at a part of peripheral surface thereof a round recess 56. When the cam plate 53 stands in its stand-by position, a round projection 62a of a leading end of a terminal 62 of a switch 61 is put into the round recess 56, so that the terminal 62 and another terminal 63 are not in contact with each other. When, under this condition, the power button of the image pick-up device 1 is turned ON, the cam plate 53 starts to rotate. Upon this, the round projection 62a of the leading end of the terminal 62 is pushed out from the round recess 56, so that the terminal 62 is brought into contact with the other terminal 63 achieving ON condition of the switch 61. Even after the lift body 42 is moved down by the first cam 54, the cam plate 53 continuously rotates and after the cam plate 53 makes one turn, the round projection 62a of the leading end of the terminal 62 is brought into engagement with the round recess 56 as is seen from FIG. 8 thereby to cause non-contact between the terminals 62 and 63 and thus deenergization of the motor 51 and stopping rotation of the cam plate 53. Accordingly, the first cam 54 takes its stand-by posture at the same or original position relative the pressed surface 46.

Figure 10:
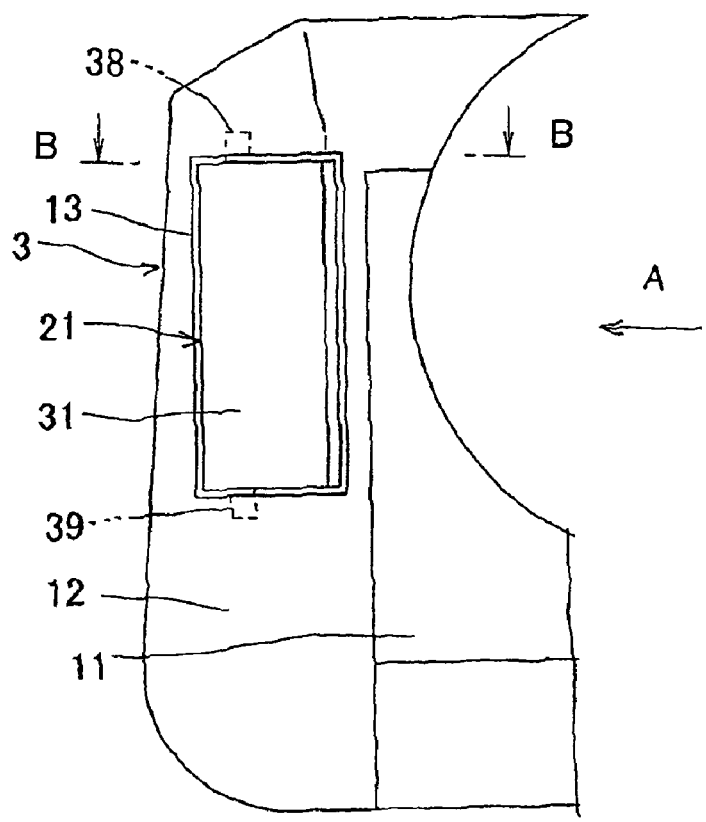
FIG. 10 is a front view of an essential portion in a condition wherein the flash device is retracted.
Figure 11:
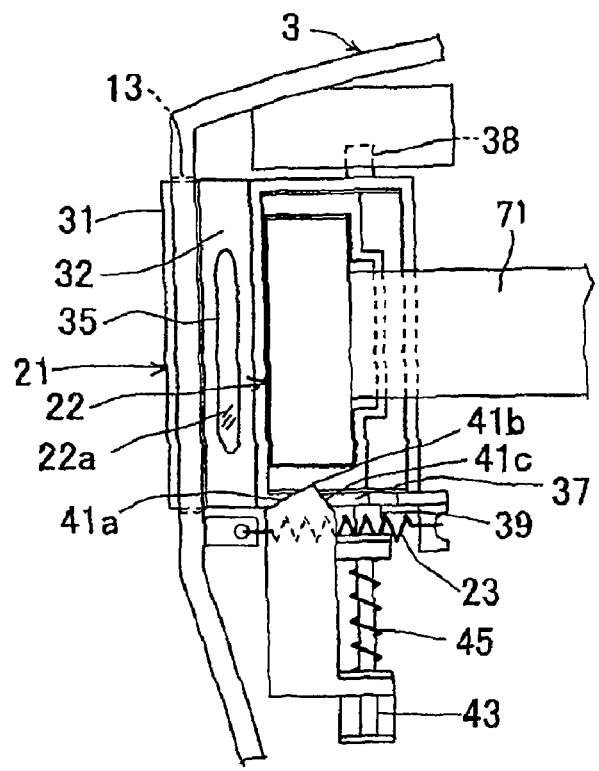
FIG. 11 is a side view taken from the direction of arrow-A of FIG. 10.
Figure 12:
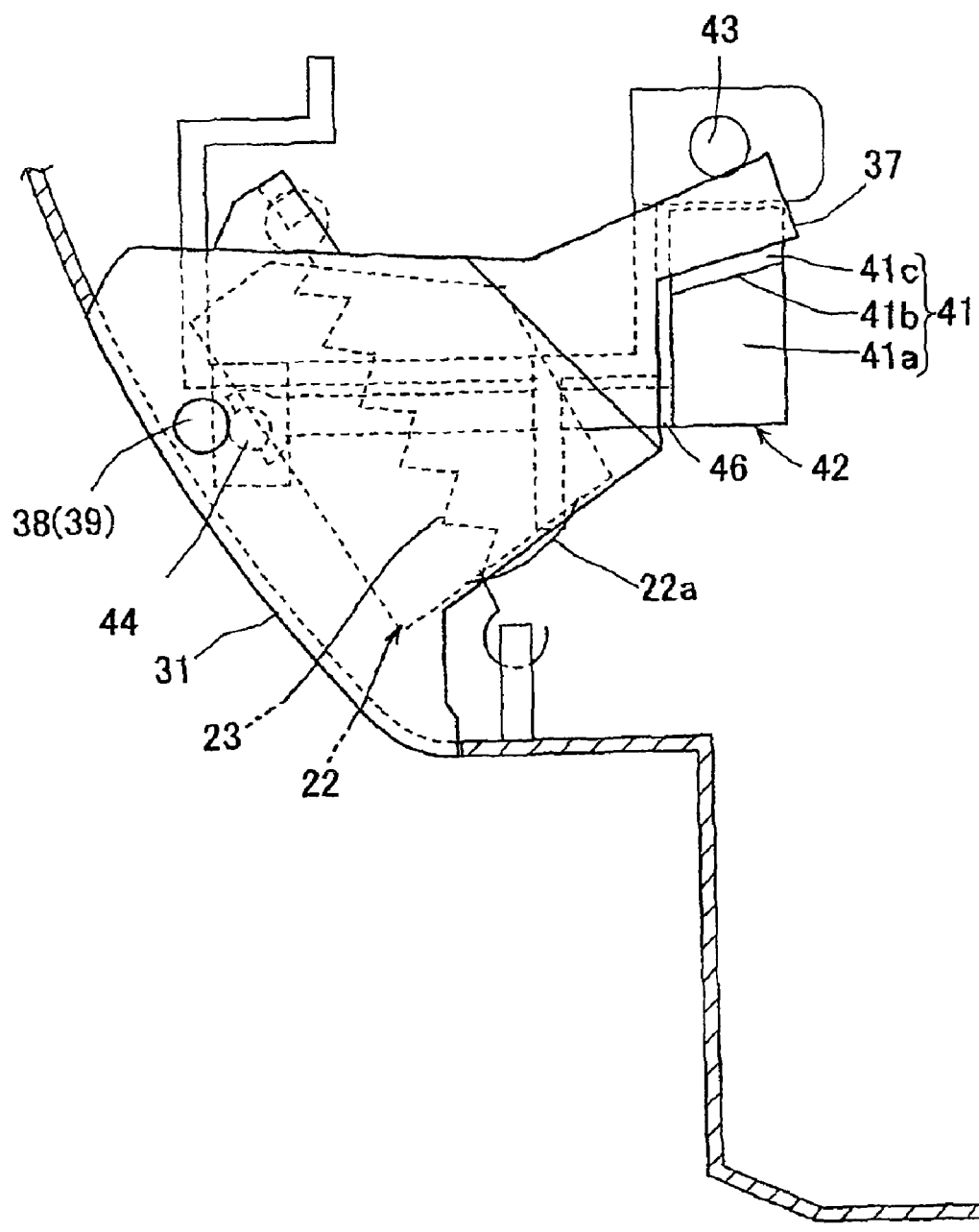
FIG. 12 is a sectional view taken along the line B-B of FIG. 10.

In the following, operation of the image pick-up device 1 will be described with reference to FIGS. 10 to 15. FIG. 10 is a front view of an essential portion in a condition wherein the flash device 10 of FIG. 1 is retracted, FIG. 11 a side view taken from the direction of the arrow "A" of FIG. 10, and FIG. 12 is a sectional view taken along the line B-B of FIG. 10.

Figure 9:
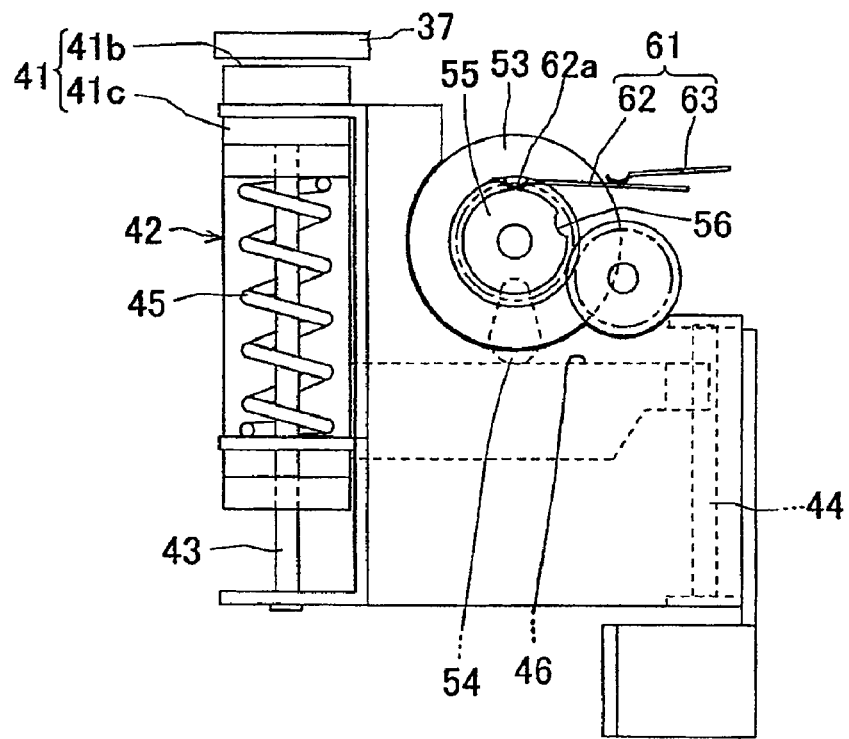
FIG. 9 is an illustration showing an operation of the second cam (after the second cam pushes down the elevating body).

In a condition wherein the flash device 10 is retracted in the camera body 3, the open portion 13 is fully closed by the first plate portion 31 of the cabinet 21 as is seen from FIG. 10. Under this condition, as is seen from FIGS. 11 and 12, the locked portion 37 of the cabinet 21 is kept engaged with the inclined surface 41c of the reversed V-shaped lock portion 41 thereby to be prevented from rotation. When then the power button of the image pick-up device 1 is turned ON, the motor 51 of the lock canceling mechanism 25 becomes energized as is described hereinabove, and thus, the cam plate 53 is turned and as is seen from FIG. 9, the pressed surface 46 is pressed by the first cam 54 thereby to push down the lift body 42 against the biasing force of the compressed coil spring 45.

Due to the pushed down movement of the lift body 42, the engagement between the lock portion 41 and the locked portion 37 becomes cancelled, and thus, the cabinet 21 is turned by the biasing force of the tension coil spring 23 and thus projected from the open portion 13. In FIG. 11, denoted by numeral 71 is a flexible printed wiring board connected to the light emitter 22.

Figure 13:
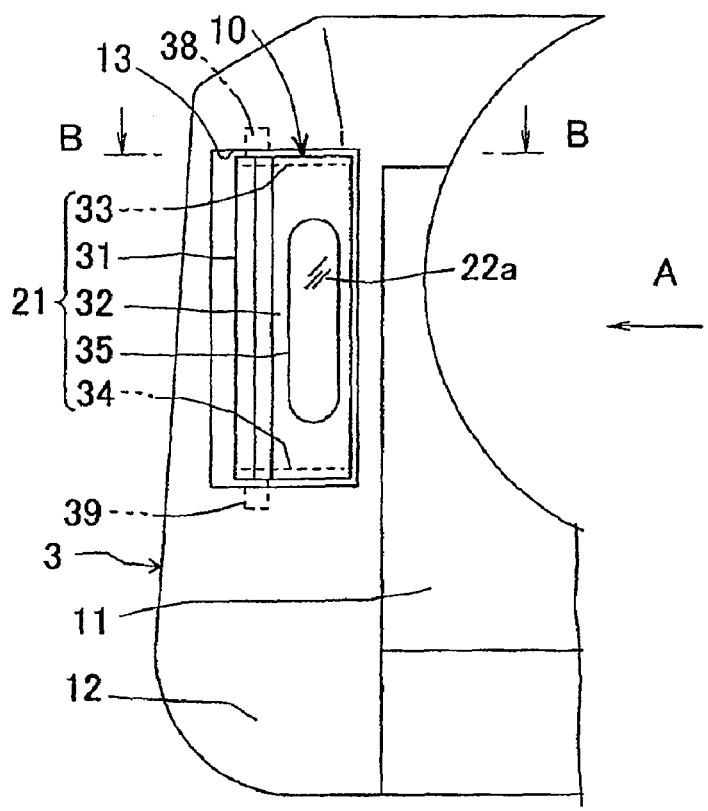
FIG. 13 is a front view of an essential portion in a condition wherein the flash device is projected.
Figure 14:
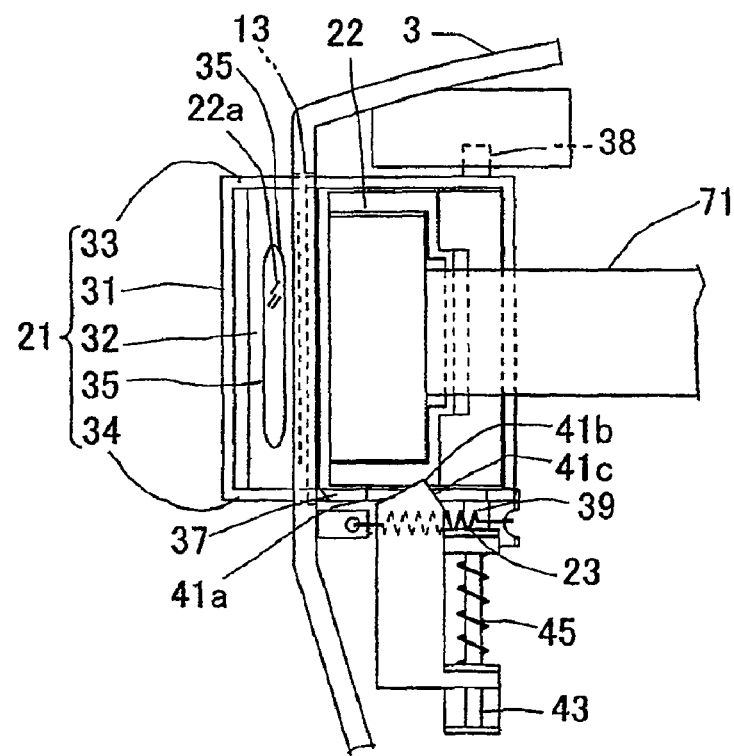
FIG. 14 is a side view taken from the direction of arrow-A of FIG. 13.
Figure 15:
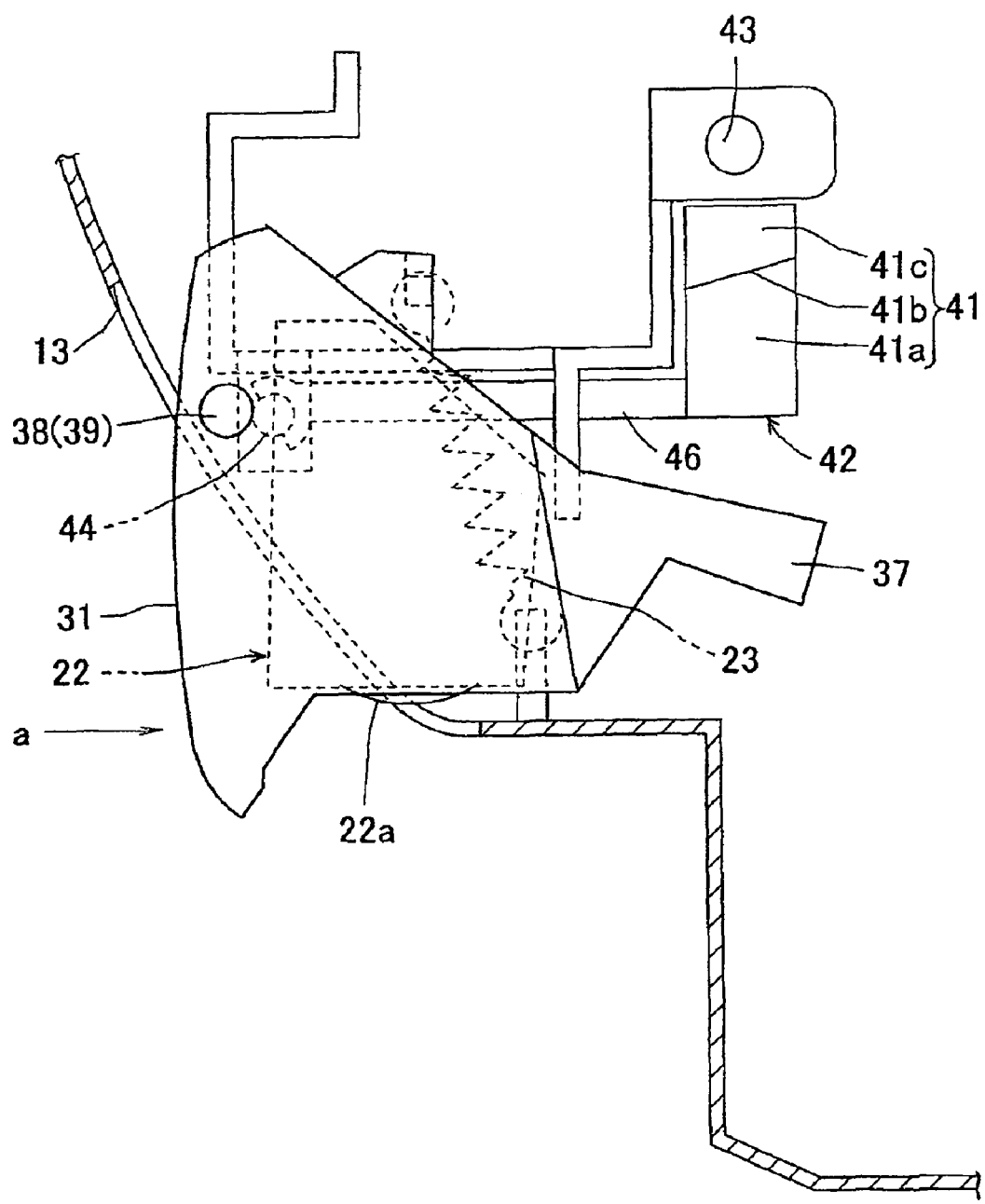
FIG. 15 is a sectional view taken along the line B-B of FIG. 13.

FIG. 13 is a front view of an essential portion in a condition wherein the flash device 10 of FIG. 2 is kept projected, FIG. 14 is a side view taken from the direction of the arrow "A" of FIG. 13, and FIG. 15 is a sectional view taken along the line B-B of FIG. 13. As is seen from FIG. 13, the first and second plate portions 31 and 32 of the cabinet 21 project from the open portion 13. The second plate portion 32 straddles a space between the first plate portion 31 and the open portion 13. The light emitting surface 22a of the light emitter 22 is exposed to the outside of the camera body 3 through the cut window portion 35 formed in the second plate portion 32 thereby making the flash device 10 operative in use.

In case of retracting the flash device 10 into the cameral body 3, the outer surface of the first plate portion 31 is pressed in the direction of the arrow "a" as is seen from FIG. 15. With this, the cabinet 21 is turned in a counterclockwise direction about a common axis of the shaft parts 38 and 39. When the cabinet 21 is turned in the counterclockwise direction, the locked portion 37 is brought into contact with the inclined surface 41a of the lock portion 41 thereby to push down the lock portion 41 against the biasing force of the compressed coil spring 45. When the locked portion 37 passes by the top portion 41b of the lock portion 41, the lock portion 41 is moved upward due to the biasing force of the compressed coil spring 45, so that as is seen from FIG. 12, the inclined surface 41c of the lock portion 41 is brought into engagement with the locked portion 37 thereby to prevent a return turning of the cabinet 21 resulting in that the open portion 13 is closed by the first plate portion 31. In order to prevent the lock portion 41 and thus the lift body 42 from being pressed down by the biasing force of the compressed coil spring 45, the biasing force of the compressed coil spring 45 is set larger than the biasing force of the tension coil spring 23.

When taking a picture of a person with the aid of a flash device, a so-called red eye phenomenon might be observed in the picture if the pupils of person's eyes are opened. This is because of reflection of the color of retina.

As is known, one of the methods of reducing such red eye phenomenon is to increase a lateral distance between the image pick-up lens and the flash device. If the flash device is mounted above the image pick-up lens (viz., lens barrel), a satisfied lateral distance is not obtained.

However, due to the above-mentioned construction in an embodiment, it is possible to sufficiently increase the lateral distance and thus reduction of the undesired red eye phenomenon is achieved.

In the above-mentioned embodiment, the motor 51 is used as one part of the lock canceling mechanism 25 and the power of the motor 51 is used for operating the lock mechanism 24. However, the lock canceling mechanism 25 may be of a type that operates the lock mechanism 24 manually. In the embodiment, the flash device is arranged at one side of the camera body 3. However, if possible, the flash device may be arranged at both sides of the cameral body.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image pick-up device comprising:
   a camera body;
   a lens barrel mounted to the camera body;
   a pop-up type flash device that is retracted in the camera body when not in use and projected from the camera body when in use, in which the flash device comprises:
      a cabinet pivotally connected to the camera body in such a manner as to be projected sideward to an outside of the camera body through an open portion when the flash device is in use and retracted in the camera body through the open portion when the flash device is not in use;
      a light emitter installed in the cabinet;
      a spring providing the cabinet with a biasing force in a direction to project the cabinet outward from the open portion;
      a lock mechanism that locks the cabinet at a position to close the open portion against force of the spring; and
      a lock canceling mechanism that cancels the locked condition of the cabinet by operating the lock mechanism; and
   a structure including a gripping surface provided by one side surface of the camera body and the open portion provided in a given surface that extends between a front end of the gripping surface and a front part of the lens barrel,
   wherein the flash device is retracted in the camera body through the open portion when not in use and projected sideward to the outside of the camera body through the open portion when in use, in which the lock mechanism comprises:
      a lift body that has at an upper part thereof a reversed V-shaped lock portion that is engageable with a locked portion provided by the cabinet;
      a pair of guide shafts that guide an upward and downward movement of the lift body; and
      a spring that biases the lift body upward to a position to cause the reversed V-shaped lock portion to engage with the locked portion.

2. An image pick-up device as claimed in claim 1, in which a recording medium storage portion is provided inside the gripping surface.

3. An image pick-up device as claimed in claim 1, in which the given surface is inclined relative to the gripping surface, and in which the open portion is provided in the given inclined surface.

4. An image pick-up device as claimed in claim 1, in which the cabinet comprises:

a first plate portion that is pivoted outward from the open portion to become flush with the gripping surface when the flash device is in use and pivoted inward to close the open portion to become flush with the given surface; and a second plate portion that extends inward from the first plate portion, the second plate portion being projected outward from the open portion and straddling a space between the first plate portion and the open portion when the first plate portion is projected outward from the open portion, wherein the second plate portion is provided a cut window portion to which a light emitting face of the light emitter is fixed.

5. An image pick-up device as claimed in claim 1, in which the spring for providing the cabinet with the biasing force in a direction to project the cabinet outward from the open portion is a tension coil spring.

6. An image pick-up device as claimed in claim 1, in which the spring for biasing the lift body upward to the position to cause the reversed V-shaped lock portion to engage with the locked portion is a compressed coil spring.

* * * * *